(12) United States Patent
Huang et al.

(10) Patent No.: US 12,025,443 B2
(45) Date of Patent: Jul. 2, 2024

(54) METHOD AND APPARATUS FOR IDENTIFYING UPDATED ROAD, DEVICE AND COMPUTER STORAGE MEDIUM

(71) Applicant: BEIJING BAIDU NETCOM SCIENCE AND TECHNOLOGY CO., LTD., Beijing (CN)

(72) Inventors: Jizhou Huang, Beijing (CN); Deguo Xia, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 417 days.

(21) Appl. No.: 17/410,878

(22) Filed: Aug. 24, 2021

(65) Prior Publication Data
US 2022/0067370 A1 Mar. 3, 2022

(30) Foreign Application Priority Data
Aug. 28, 2020 (CN) .......................... 202010889015.3

(51) Int. Cl.
*G01C 21/00* (2006.01)
*G01C 11/06* (2006.01)
(Continued)

(52) U.S. Cl.
CPC .......... *G01C 11/06* (2013.01); *G01C 21/3859* (2020.08); *G01C 21/3885* (2020.08);
(Continued)

(58) Field of Classification Search
CPC ... G06T 7/33; G06T 7/73; G06T 2207/20084; G06T 2207/30244; G06T 2207/30261;
(Continued)

(56) References Cited

U.S. PATENT DOCUMENTS 8,731,305 B1    5/2014  Mantri
2021/0233208 A1* 7/2021  Lewis ..................... G01C 21/32
2022/0044072 A1* 2/2022  Simonson ............. G06V 10/82

FOREIGN PATENT DOCUMENTS

CN    108955693 A    12/2018
CN    109241069 A     1/2019
(Continued)

OTHER PUBLICATIONS

Favyen Bastani, Songtao He, Satvat Jagwani, Edward Park, Sofiane Abbar, Mohammad Alizadeh, Hari Balakrishnan, Sanjay Chwla, Sam Madden, Mohammad Amin Sadeghi, Inferring and Improving Street Maps with Data-Driven Automation, Sep. 21, 2019, arXIV 1910.04869v1. (Year: 2019).*
(Continued)

*Primary Examiner* — Nancy Bitar
*Assistant Examiner* — Heath E. Wells
(74) *Attorney, Agent, or Firm* — Ladas & Parry, LLP (57) ABSTRACT

The present application discloses a method and apparatus for identifying an updated road, a device and a computer storage medium, and relates to the field of big data technologies. A specific implementation solution is as follows: comparing a road area extracted based on the latest satellite image with a road area extracted based on a historical satellite image, to obtain a candidate updated road; mapping the candidate updated road into road network data according to a coordinate position of the candidate updated road; acquiring a user trajectory set corresponding to the candidate updated road within a recent preset period; and identifying, based on a matching result between the user trajectory set and the road network data, whether the candidate updated road is an actual updated road. Updated roads can be more accurately identified through the method according to the present application.

9 Claims, 6 Drawing Sheets

(51) Int. Cl.
*G06F 16/23* (2019.01)
*G06F 18/214* (2023.01)
*G06N 3/08* (2023.01)
*G06V 20/10* (2022.01)

(52) U.S. Cl.
CPC ............ *G06F 16/23* (2019.01); *G06F 18/214* (2023.01); *G06N 3/08* (2013.01); *G06V 20/182* (2022.01)

(58) Field of Classification Search
CPC ............ G06T 7/74; G06T 2207/20076; G05D 1/0221; G05D 1/024; G05D 1/0248; G05D 1/0274; G06V 10/443; G06V 10/751; G06V 10/82; G06V 10/44; G06V 10/74; G06V 20/58; G06V 20/182; G01S 17/06; G01S 17/89; G06N 3/045; G06N 3/08; G01C 11/06; G01C 21/3859; G01C 21/3885; G01C 21/3815; G01C 21/3852; G01C 21/32; G01C 21/3407; G06F 16/23; G06F 18/214; G06F 18/24133; G06F 16/2455; G06F 16/24549; G06F 16/248; G06F 16/29
See application file for complete search history.

(56) References Cited

FOREIGN PATENT DOCUMENTS

| | | | | | |
|---|---|---|---|---|---|
| CN | 110006439 | A | | 7/2019 | |
| CN | 110852342 | A | * | 2/2020 | ........... G06K 9/6215 |
| CN | 110852342 | A | | 2/2020 | |
| CN | 111121797 | A | | 5/2020 | |
| JP | 2005258728 | A | | 9/2005 | |
| JP | 2007041294 | A | | 2/2007 | |
| JP | 2016180980 | A | | 10/2016 | |
| JP | 2019095569 | A | | 6/2019 | |
| JP | 2019144193 | A | | 8/2019 | |
| JP | 2020067656 | A | * | 4/2020 | ......... G01C 21/3602 |
| JP | 2020067656 | A | | 4/2020 | |
| JP | 2020520493 | A | | 7/2020 | |

OTHER PUBLICATIONS

Dan Klang, Automatic Detection of Changes in Road Databases using Satellite Imagery, 1998, IAPRS, Symposium on GIS—between Vistions and Applications, Stuttgart, Germany, vol. 32/4m pp. 293-299. (Year: 1998).*

Extended European Search Report from EP app. No. 21164452.1, dated Sep. 15, 2021, all pages.

Bastani et al., "Inferring and Improving Street Maps with Data-Driven Automation", Cornell University Library, Oct. 2, 2019, all pages.

Klang et al., "Automatic Detection of Changes in Road Databases Using Satellite Imagery", Dec. 31, 1998, all pages.

First Office Action for Chinese Patent Application 202010889015.3 issued on Jul. 11, 2022 and Its English Translation provided by Global Dossier.

Notice of reason for refusal for Japanese Application 2021137229 issued on Aug. 9, 2022 and Its English Translation provided by Global Dossier.

Detecting building and road from aerial images using Convolutional Neural Network, Shunta Sudou t Takayoshi Yamashita t Yoshimitsu Aoki t Hadada University Graduate School of Science—2016, and its English Translation provided by Google Translate.

First Office Action and search report for Chinese Patent Application 202010889015.3 issued on Jul. 11, 2022 and Its English Translation provided by Global Dossier.

* cited by examiner

METHOD AND APPARATUS FOR IDENTIFYING UPDATED ROAD, DEVICE AND COMPUTER STORAGE MEDIUM

The present application claims the priority of Chinese Patent Application No. 202010889015.3, filed on Aug. 28, 2020, with the title of "Method and apparatus for identifying updated road, device and computer storage medium". The disclosure of the above application is incorporated herein by reference in its entirety.

FIELD OF THE DISCLOSURE

The present application relates to the field of computer technologies, and particularly to a method and apparatus for identifying an updated road, a device and a computer storage medium in the field of big data technologies.

BACKGROUND OF THE DISCLOSURE

In navigation electronic maps, road network data formed by roads is basic data of navigation route planning. The accuracy of the road network data greatly affects the accuracy and rationality of the navigation route planning, thus affecting the actual navigation experience of users. For example, if a new road is not quickly discovered and updated to the road network data, a shorter route that could have passed through the road may not be recommended to the users, causing the user to detour. Therefore, there is a need to find changes in road data more comprehensively and accurately so as to update the changes to the road network data.

SUMMARY OF THE DISCLOSURE

In view of this, the present application provides a method and apparatus for identifying an updated road, a device and a computer storage medium.

In a first aspect, the present application provides a method for identifying an updated road, including:
  comparing a road area extracted based on the latest satellite image with a road area extracted based on a historical satellite image, to obtain a candidate updated road;
  mapping the candidate updated road into road network data according to a coordinate position of the candidate updated road;
  acquiring a user trajectory set corresponding to the candidate updated road within a recent preset period; and
  identifying, based on a matching result between the user trajectory set and the road network data, whether the candidate updated road is an actual updated road.

In a second aspect, the present application provides an electronic device, comprising:
  at least one processor; and
  a memory communicatively connected with the at least one processor;
  wherein the memory stores instructions executable by the at least one processor, and the instructions are executed by the at least one processor to enable the at least one processor to perform a method for identifying an updated road, wherein the method comprise:
  comparing a road area extracted based on the latest satellite image with a road area extracted based on a historical satellite image, to obtain a candidate updated road;
  mapping the candidate updated road into road network data according to a coordinate position of the candidate updated road;
  acquiring a user trajectory set corresponding to the candidate updated road within a recent preset period; and
  identifying, based on a matching result between the user trajectory set and the road network data, whether the candidate updated road is an actual updated road.

In a third aspect, the present application provides a non-transitory computer readable storage medium with computer instructions stored thereon, wherein the computer instructions are used for causing a computer to perform a method for identifying an updated road, wherein the method comprises:
  comparing a road area extracted based on the latest satellite image with a road area extracted based on a historical satellite image, to obtain a candidate updated road;
  mapping the candidate updated road into road network data according to a coordinate position of the candidate updated road;
  acquiring a user trajectory set corresponding to the candidate updated road within a recent preset period; and
  identifying, based on a matching result between the user trajectory set and the road network data, whether the candidate updated road is an actual updated road.

Effects of the above options will be described below with reference to specific embodiments.

BRIEF DESCRIPTION OF DRAWINGS

The accompanying drawings are intended to better understand the solution and do not constitute limitations on the present application. In the drawings.

DETAILED DESCRIPTION OF PREFERRED EMBODIMENTS

Exemplary embodiments of the present application are described below with reference to the accompanying drawings, including various details of the embodiments of the present application to facilitate understanding, and they should be considered as exemplary only. Therefore, those of ordinary skill in the art should be aware that the embodiments described herein may be changed and modified in various ways without deviating from the scope and spirit of the present application. Similarly, for the sake of clarity and simplicity, descriptions of well-known functions and structures are omitted in the following description.

Embodiment 1

Figure 1:
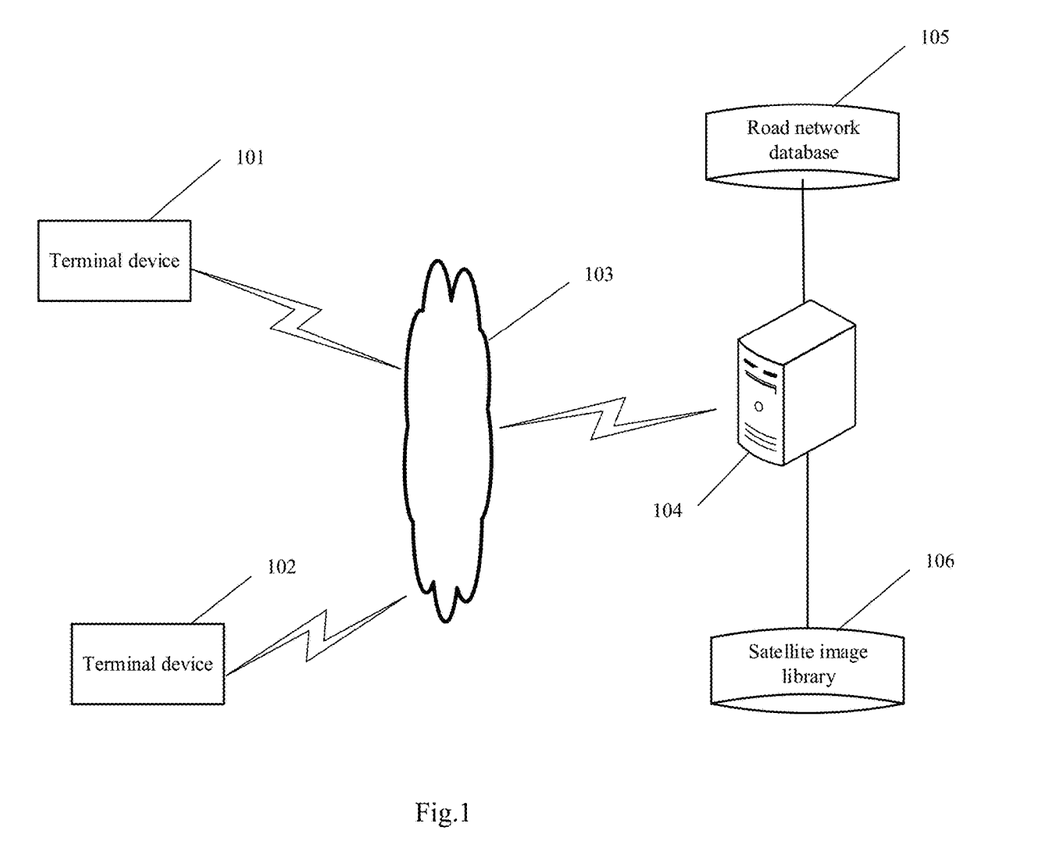
FIG. 1 is an exemplary system architecture to which embodiments of the present application can be applied.

FIG. 1 illustrates an exemplary system architecture to which embodiments of the present application can be applied. As shown in FIG. 1, the system architecture may include terminal devices 101 and 102, a network 103 and a server 104. The network 103 is a medium for providing communication links among the terminal devices 101, 102, and the server 104. The network 103 may include various types of connections, such as wired, wireless communication links, or fiber optic cables.

A user may use the terminal devices 101 and 102 to interact with the server 104 through the network 103. Various applications such as map applications, voice interaction applications, webpage browser applications, and communication applications may be installed on the terminal devices 101 and 102.

The terminal devices 101 and 102 may be a variety of user devices capable of supporting and displaying map applications, which include, but are not limited to, smart phones, tablets, smart wearable devices, and so on. The apparatus according to the present application may be arranged and run in the server 104. The apparatus may be implemented as a plurality of software or software modules (for example, to provide distributed services), or as a single software or software module, which is not specifically limited herein.

For example, an apparatus for identifying an updated road is arranged and run in the server 104. The server 104 may pre-collect and maintain user trajectory data uploaded by terminal devices (including 101 and 102) during the use of the map applications; and can interact with a road network database 105 to acquire and update road network data; and can also interact with a satellite image library 106 to acquire satellite images. In the embodiment of the present application, the server 104 can use the satellite images, the user trajectory data and the road network data to identify an updated road and timely update the road network data. The update of the road network data enables a server side of a map application to better provide map services, such as a route query service and a navigation service, for the terminal devices.

In addition to the above manners, the apparatus for identifying an updated road may also be arranged and run in a computer system with strong computing power.

The server 104 may be either a single server or a server cluster consisting of a plurality of servers. It shall be understood that the number of the terminal devices, the network and the server in FIG. 1 is only schematic. According to implementation requirements, there may be any number of terminal devices, networks and servers.

Embodiment 2

Figure 2:
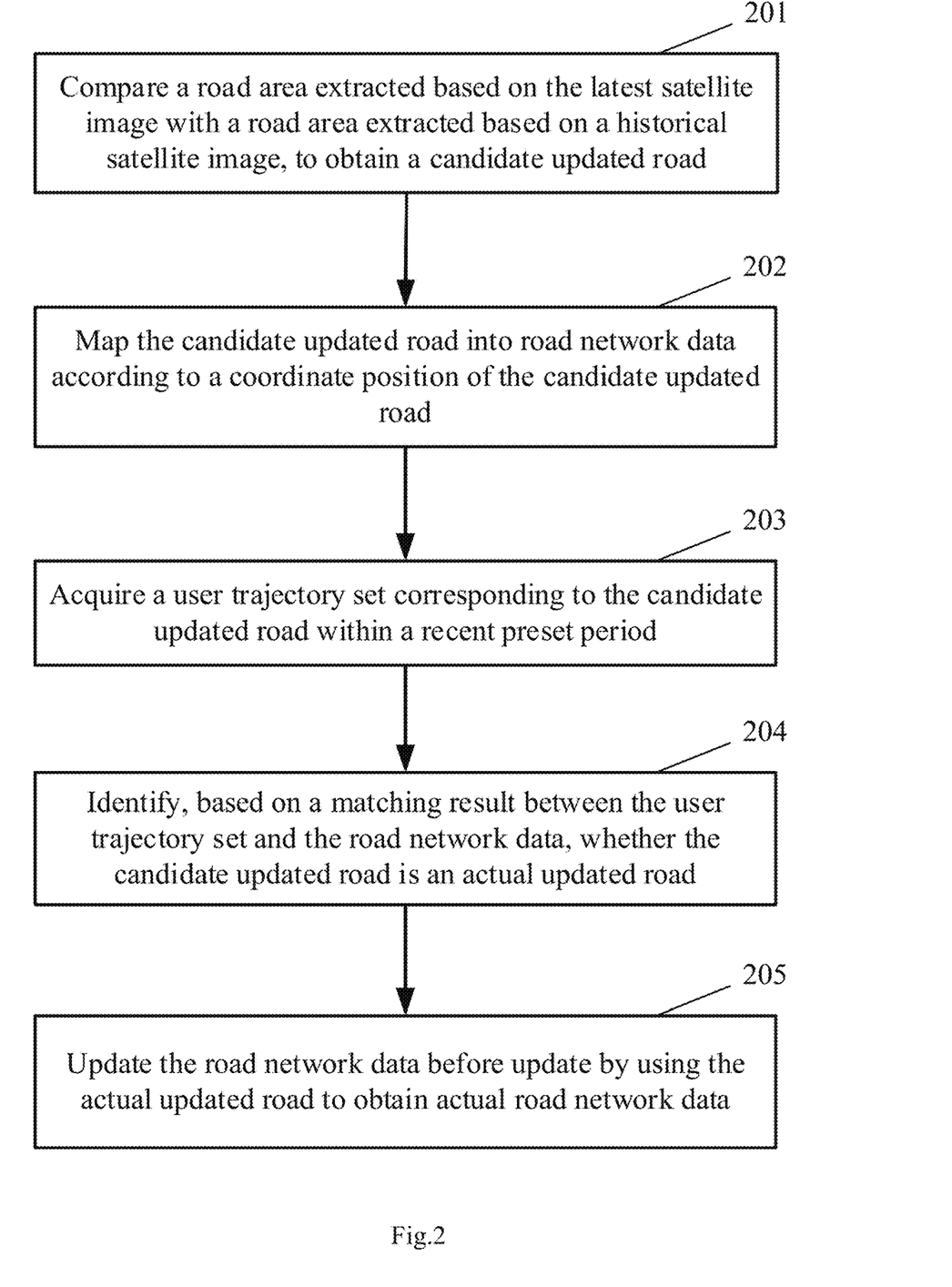
FIG. 2 is a main flow chart of a method according to Embodiment 2 of the present application.

FIG. 2 is a main flow chart of a method according to Embodiment 2 of the present application. As shown in FIG. 2, the method may include the following steps:

In 201, a road area extracted based on the latest satellite image is compared with a road area extracted based on a historical satellite image, to obtain a candidate updated road.

This step implements road extraction based on a satellite image. Since the updated road in the present application may be triggered periodically or based on a special event, historical time may be divided into periods. A satellite image within a recent preset period may be regarded as the latest satellite image, and a satellite image within a previous period of the recent preset period may be regarded as the historical satellite image. The timeliness of a road discovery mechanism can be adjusted by controlling a length of the period. Therefore, this step may be specifically implemented with the following steps:

S11: a satellite image within the recent preset period is acquired and a road area is extracted from the acquired satellite image.

S12: a satellite image within the recent preset period is acquired and a road area is extracted from the acquired satellite image.

Both steps S11 and S12 relate to extracting a road area from a satellite image. The satellite image is an image file with coordinate information on the earth taken by a satellite. In the embodiment of the present application, the road area may be extracted from the satellite image by inputting the acquired satellite image to a pre-trained road identification model; and acquiring a road area obtained by the road identification model based on pixel classification.

In other words, the extraction of the road area is modeled as a binary semantic segmentation issue of pixel granularity, that is, pixels in satellite image are classified by the road identification model to determine whether the pixels belong to the road area.

During pre-training of the road identification model, training data may be obtained after the historical satellite image is associated with road information in a road network, that is, the training data includes the historical satellite image and road area information in the historical satellite image; or training data may be obtained after the historical satellite image is manually labeled with road areas. Then a deep neural network is trained by using the training data to obtain the road identification model. The deep neural network used may be a U-Net, a Deep Residual U-Net, or the like. The U-Net is one of the algorithms for performing semantic segmentation by using a full convolutional network, which is named due to its symmetric U-shaped structure that uses compression paths and extension paths. A training objective used during training of the road identification model is that: results of pixel classification by the deep neural network are consistent with information of whether corresponding pixels in the training data belongs to the road area. In other words, classification results for the pixels in the historical satellite image by the deep neural network are consistent with expectations in the training data.

Certainly, in addition to the manner of extracting the road area based on pixel classification, the road area may also be extracted from the satellite image in other manners.

Road area information extracted for satellite images at various stages is stored, and the corresponding road area information can be directly acquired and used when it is used as the historical satellite image.

S13: the extracted road areas are compared to obtain a candidate updated road.

A road area extracted based on the latest satellite image is compared with a road area extracted based on a historical satellite image. It shall be noted that, during comparison, parts corresponding to the same geographic area need to be compared. A road area existing in the latest satellite image but not existing in the historical satellite image is considered to be a new road. A road area not existing in the latest satellite image but existing in the historical satellite image is considered to be a disappeared road.

Figure 3:
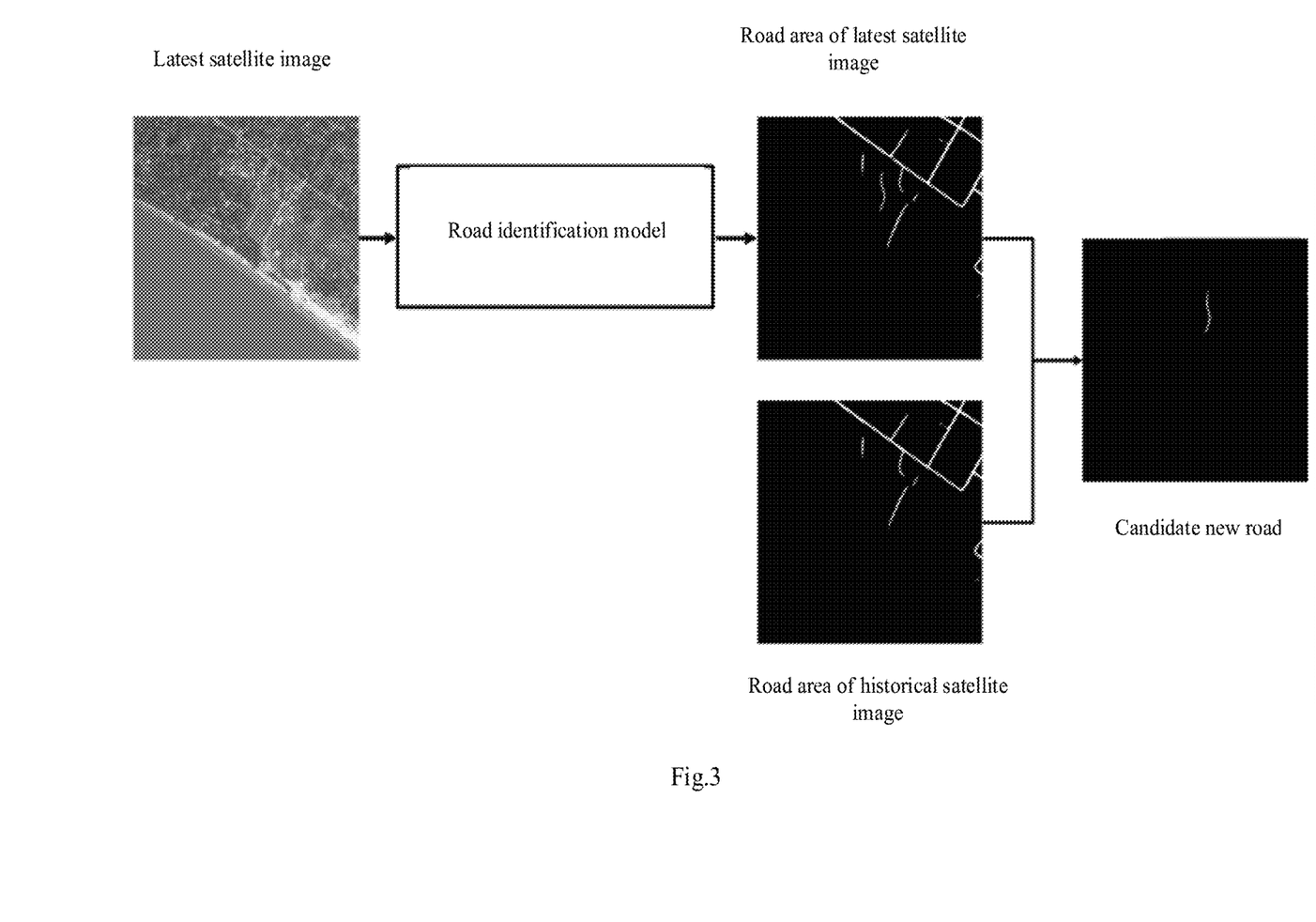
FIG. 3 is a schematic diagram of extraction of a road area according to Embodiment 2 of the present application.

As shown in FIG. 3, a road area is extracted after the latest satellite image passes through the road identification model, and after the extracted road area is compared with the road area extracted based on the historical satellite image, if a road in the latest satellite image is found to be disappeared from the historical satellite image, it is identified as a candidate new road.

An updated road can be found more timely and comprehensively based on the satellite image. However, the obtained updated road may not be accurate since the satellite image may be obscured by clouds, trees or the like. In this step, the updated road obtained by using the satellite image needs to be further determined subsequently based on user trajectory identification, and thus the updated road obtained in this step is referred to as a candidate updated road.

In 202, the candidate updated road is mapped into road network data according to a coordinate position of the candidate updated road.

Since the subsequent identification based on user trajectories of whether the candidate updated road is an actual updated road is performed by comparing a matching probability between road network data before update and road network data after update, this step actually assumes that the road network data is updated first by using the updated road, but the road network data after update may not be accurate and may not be final actually-updated road network data. Therefore, the road network data after update in this step is referred to as to-be-verified road network data.

Figure 4:
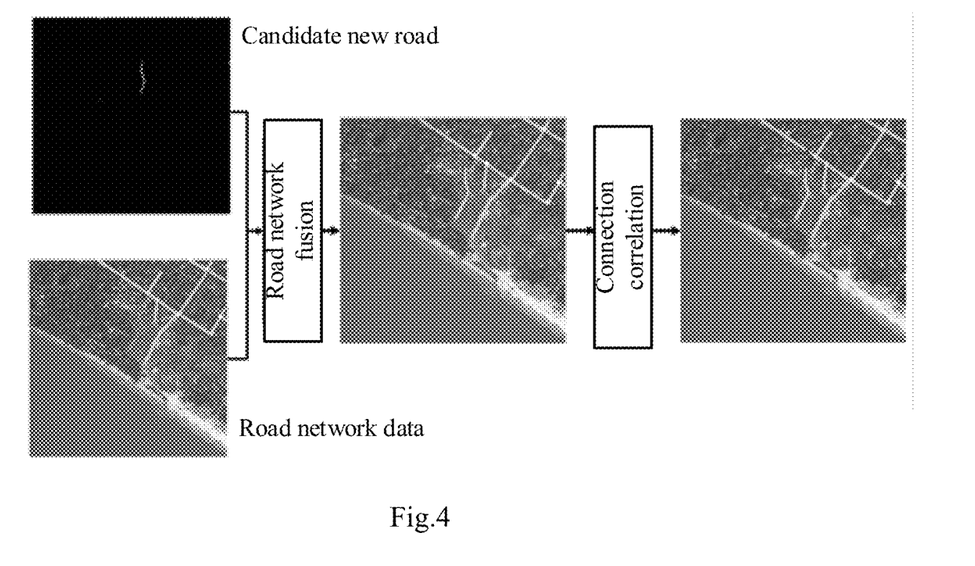
FIG. 4 is a schematic diagram of mapping of a candidate new road to road network data according to Embodiment 2 of the present application.

Specifically, for the new road, a candidate new road may be added to the road network data (referred to as road network fusion in the figure) according to a coordinate position of the candidate new road, and a connection relationship (referred to as connection correlation) between the candidate new road and an existing road in the road network data (existing road network data, that is, actual road network data that has been previously determined) is added, to form to-be-verified road network data after update, as shown in FIG. 4.

Figure 5:
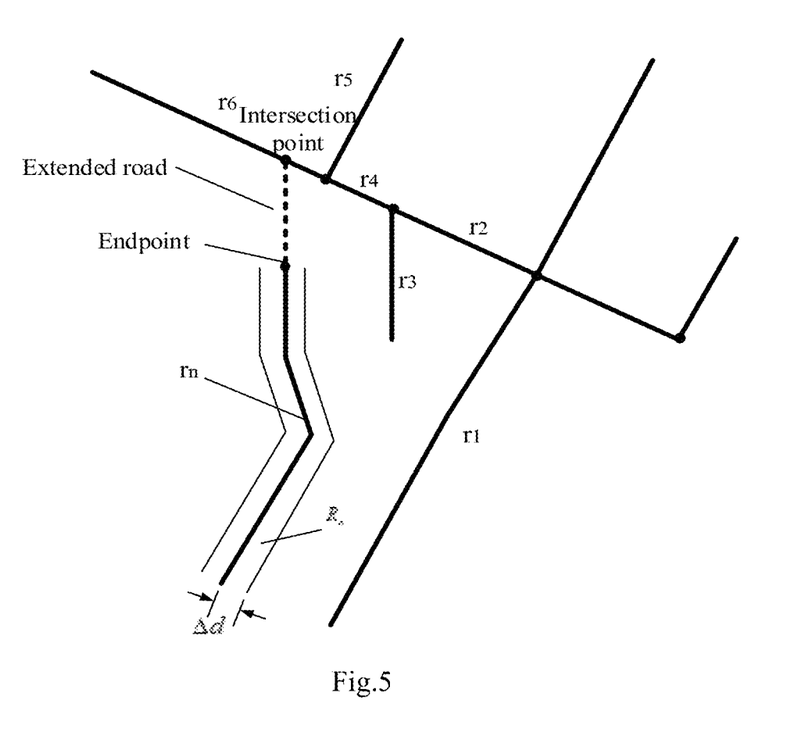
FIG. 5 is an example diagram of a connection relationship between a candidate new road and an existing road according to Embodiment 2 of the present application.

When the connection relationship between the candidate new road and the existing road in the road network data is added, an implementable manner is provided herein: first extending the candidate new road along a road direction to intersect with the existing road in the road network data. For example, as shown in FIG. 5, the candidate new road is assumed as $r_n$, and after extending along a direction of $r_n$, intersects with a road $r_6$.

If a distance between an intersection point and an endpoint of the candidate new road $r_n$ (i.e., a length of the extended part) is less than or equal to a preset first distance threshold, an extended road (the dotted part) between the intersection point and the endpoint and the connection relationship between the candidate new road $r_n$ and the existing road $r_6$ to the road network data.

For the disappeared road, the disappeared road may be deleted from the road network data according to a coordinate position of the candidate disappeared road, to form to-be-verified road network data after update. It may be judged whether there is a road in the road network data that has the same direction as the candidate disappeared road and is at a distance less than a preset second distance threshold from the coordinate position of the candidate disappeared road, if the above judgment result if positive, the road is considered as an existing road in the road network data that corresponds to the candidate disappeared road and is deleted from the road network data, to form to-be-verified road network data after update.

In 203, a user trajectory set corresponding to the candidate updated road within a recent preset period is acquired.

Firstly, user trajectories within the recent preset period are acquired. The user trajectories may include driving trajectories, cycling trajectories, walking trajectories, and so on. Such user trajectories may be uploaded by the user and then stored in a map application database, and are directly acquired from the map application database in this step.

Each user trajectory is a sequence of n adjacent trajectory points with a time partial order relationship. For example, a user trajectory T is formed by a trajectory point sequence $<p_1, p_2, \ldots, p_n>$. The trajectory point $p_i$ is a 2-tuple $<l_i, t_i>$, in which $l_i$ is space information, generally geographic coordinate information, and $t_i$ is time information.

Since the user trajectory may be obtained by various positioning methods, the positioning accuracy is not accurate. Therefore, a radiation area is defined for the candidate updated road. User trajectories whose number of trajectory points falling into a radiation area of the candidate updated road is greater than or equal to a preset number threshold or whose proportion of trajectory points falling into a radiation area of the candidate updated road is greater than or equal to a preset proportion threshold are determined as user trajectories corresponding to the candidate updated road, to form the user trajectory set.

The radiation area may be defined as: an area formed within left and right preset distances Δd based on a center line of the candidate updated road $r_n$, as shown in FIG. 5, denoted as $R_n$. If one user trajectory $T_k$ meets one of the following conditions, the user trajectory is added to a user trajectory set $C_{rn}$ of $r_n$.

Condition 1: $N_{R_n}^{T_k} \geq M_{R_n}$

Condition 2:

$$\frac{N_{R_n}^{T_k}}{N^{T_k}} \geq \gamma_{R_n}$$

$N_{R_n}^{T_k}$ is the number of trajectory points of the user trajectory $T_k$ that fall into a radiation area $R_n$, and $N^{T_k}$ is the number of trajectory points of the user trajectory $T_k$. $M_{R_n}$ and $\gamma_{R_n}$ are preset thresholds, which may be empirical values or experimental values or may be determined in the following manner:

$$M_{R_n} = \frac{L_{r_n}}{D}$$

$L_{r_n}$ in is a length of the candidate updated road $r_n$. D is an average distance between trajectory points, which may be calculated based on all distances among the trajectory points of the user trajectory.

$$\gamma_{R_n} = \frac{L_{r_n}}{L_{T_k}}$$

$L_{T_k}$ is a length of the user trajectory $T_k$.

In 204, whether the candidate updated road is an actual updated road is identified based on a matching result between the user trajectory set and the road network data.

In this step, matching results between the user trajectory set and the road network data before update as well as the to-be-verified road network data after update are determined respectively. If the matching result between the user trajectory set and the to-be-verified road network data after update is better than the matching result between the user trajectory set and the road network data before update, the candidate updated road is identified as an actual updated road.

For each user trajectory $T_k$ in the user trajectory set $C_{rn}$, a matching probability between the user trajectory $T_k$ and the road network data $\mathbb{R}$ before update and a matching probability between the user trajectory set and the to-be-verified road network data $\widetilde{\mathbb{R}}$ after update are determined respectively through a hidden Markov model (HMM), which are respectively represented as $p(T_k, \mathfrak{R})$ and $p(T_k, \widetilde{\mathfrak{R}})$.

$$p(T_k, \mathfrak{R}) = HMM(T_k, \mathfrak{R})$$

$$p(T_k, \widetilde{\mathfrak{R}}) = HMM(T_k, \widetilde{\mathfrak{R}})$$

If an average matching probability between the user trajectories in the user trajectory set and the to-be-verified road network data after update is greater than an average matching probability between the user trajectories in the user trajectory set and the road network data before update, the candidate updated road is identified as the actual updated road. That is, if a candidate trajectory set $C_{rn}$ meets the following condition, the candidate updated road $r_n$ is identified as the actual updated road:

$$\bar{p}(C_{r_n}, \tilde{R}) > \bar{p}(C_{r_n}, R)$$

$$\bar{p}(C_{r_n}, \tilde{R}) = \frac{\sum_{T_k \in C_{r_n}} p(T_k, \tilde{R})}{|C_{r_n}|},$$

$$\bar{p}(C_{r_n}, R) = \frac{\sum_{T_k \in C_{r_n}} p(T_k, R)}{|C_{r_n}|}$$

and $|C_{r_n}|$ are the number of user trajectories in the candidate trajectory set $C_{rn}$.

When matching probabilities between the user trajectories and the road network data are determined, observation probability matrixes of the user trajectories may be determined according to distances between trajectory points in the user trajectories and roads in the road network data. Then transition probability matrixes of the user trajectories are determined according to differences between distances of two adjacent points in the user trajectories mapped to the roads in the road network data and distances of the two adjacent points in the user trajectories. Viterbi calculation is performed by using the observation probability matrixes and the transition probability matrixes of the user trajectories, to obtain the matching probabilities between the user trajectories and the road network data.

Taking the matching probability $p(T_k, \widetilde{\mathfrak{R}})$ between the user trajectory $T_k$ and the to-be-verified road network data $\widetilde{\mathbb{R}}$ after update as an example, according to distances between each trajectory point in the user trajectory $T_k$ and roads in the road network data $\widetilde{\mathbb{R}}$, observation probabilities between the trajectory point and the roads can be obtained. A smaller distance corresponds to a greater observation probability. If there are n trajectory points in the user trajectory $T_k$ and m roads in the road network data $\widetilde{\mathbb{R}}$, an obtained observation probability matrix A of the user trajectory $T_k$ is an n×m sparse matrix.

For the user trajectory $T_k$, adjacent trajectory points $p_{i-1}$ and $p_i$, transition probabilities of the trajectory point $p_{i-1}$ mapped to the roads and $p_i$ mapped to the roads may be calculated respectively, A smaller difference between a distance of the trajectory points $p_{i-1}$ and $p_i$ mapped to a road and a distance between the trajectory points $p_{i-1}$ and $p_i$ corresponds to a greater transition probability. A transition probability matrix B is obtained. The transition probability matrix B is an m×m sparse matrix.

Then, Viterbi calculation is performed by using the observation probability matrix A and the transition probability matrix B. The process of performing Viterbi calculation is actually a process of performing matching in the road network data based on the roads and calculating an optimal matching road sequence. A Viterbi algorithm is an existing algorithm, and is not described in detail herein. In other words, upon Viterbi calculation, in addition to obtaining a Viterbi probability, namely matching probability, between the user trajectory $T_k$ and the road network data $\widetilde{\mathbb{R}}$, an optimal matching road sequence of the user trajectory $T_k$ in the road network data $\widetilde{\mathbb{R}}$ can also be obtained.

A process of calculating the matching probability between the user trajectory $T_k$ and the road network data $\mathbb{R}$ before update is similar, and is not repeated herein.

If an average matching probability between the user trajectories in the user trajectory set and the to-be-verified road network data after update is less than or equal to an average matching probability between the user trajectories and the road network data before update, it is identified that the candidate updated road is not the actual updated road. Processing on the candidate updated road is ended. The road network data before update, i.e., road network data to which the candidate updated road is not added, is still adopted as the road network data.

It can be seen that after the candidate updated road is found based on the satellite image, whether the candidate updated road is the actual updated road is confirmed through changes in probabilities of the user trajectories corresponding to the candidate updated road matching the road network data before and after the road network data is updated through the road network data, so as to improve the accuracy of identification of the updated road.

In 205, the road network data before update is updated by using the actual updated road to obtain actual road network data.

As one implementation, for the new road, if it is determined in the above process that the new road better matches the road network data after update, it indicates that the connection relationship added when the candidate updated road is mapped to the road network data in the previous step 202 is correct, that is, the connection relationship is an actual connection relationship, and actual road network data is obtained by adding the connection relationship to the road network data before update.

As one preferred implementation, for the new road, a following road, whose number of occurrence is greater than or equal to a preset number threshold, of the actual new road in the optimal matching road sequence is determined, and an actual connection relationship between the actual new road and the following road is determined. The actual new road and the actual connection relationship are added to the road network data before update to obtain the actual road network data.

For example, $r_n$ in FIG. 5 is determined as the actual new road, and if $r_n$ corresponds to a user trajectories, a optimal matching road sequences may be obtained in the process of road network data matching based on Viterbi calculation. If in the a optimal matching road sequences, a following road of $r_n$ includes an r6 forward direction and an r6 backward direction, wherein the forward direction and the backward direction are two directions of the road r6 respectively, the number of occurrence of the r6 forward direction is greater than or equal to a preset number threshold, while the number of occurrence of the r6 backward direction is less than the preset number threshold, it indicates that $r_n$ is in a connection relationship with the road r6 in the forward direction but not in the backward direction. It can be seen that the method for identifying an actual connection relationship based on user trajectories is more accurate.

For the disappeared road, the actual disappeared road and connection relationships of the actual disappeared road can be deleted from the road network data before update.

Identification of the road connection relationship can be more accurate by determining based on a road sequence matching the road network data whether the updated road is in a connection relationship with the existing road in the road network.

Embodiment 3

Figure 6:
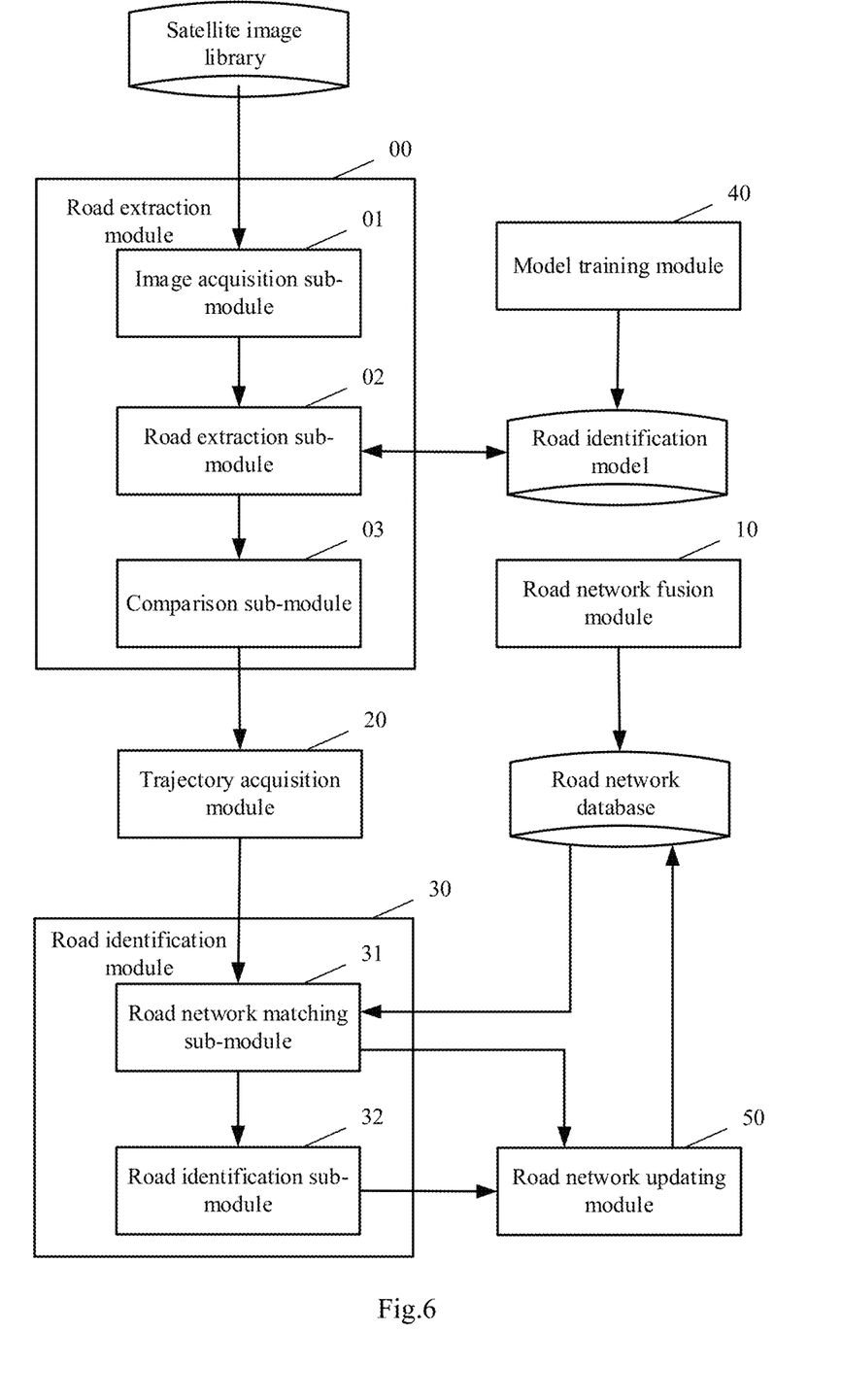
FIG. 6 is a structural diagram of an apparatus for identifying an updated road according to Embodiment 3 of the present application.

FIG. 6 is a structural diagram of an apparatus for identifying an updated road according to Embodiment 3 of the present application. The apparatus may be a server-side application or may be a functional unit such as a plug-in or a Software Development Kit (SDK) in a server-side application, or may be located in a computer system, which is not specifically limited in the embodiment of the present application. As shown in FIG. 6, the apparatus may include: a road extraction module 00, a road network fusion module 10, a trajectory acquisition module 20 and a road identification module 30, and may further include a model training module 40 and a road network updating module 50. Main functions of the component modules are as follows:

The road extraction module 00 is configured to compare a road area extracted based on the latest satellite image with a road area extracted based on a historical satellite image, to obtain a candidate updated road.

The road network fusion module 10 is configured to map the candidate updated road into road network data according to a coordinate position of the candidate updated road.

The trajectory acquisition module 20 is configured to acquire a user trajectory set corresponding to the candidate updated road within a recent preset period.

The road identification module 30 is configured to identify, based on a matching result between the user trajectory set and the road network data, whether the candidate updated road is an actual updated road.

The road extraction module 00 may specifically include: an image acquisition sub-module 01, a road extraction sub-module 02 and a comparison sub-module 03.

The image acquisition sub-module 01 is configured to acquire a satellite image within the recent preset period. The satellite image may be acquired from a satellite image library.

The road extraction sub-module 02 is configured to extract a road area from the satellite image acquired by the image acquisition sub-module 01.

Specifically, the road extraction sub-module 02 may input the satellite image acquired by the image acquisition sub-module 01 to a pre-trained road identification model; and acquire a road area obtained by the road identification model based on pixel classification.

The road identification model is pre-trained by the model training module 40. The model training module 40 is configured to obtain training data after the historical satellite image is associated with road information in a road network; or obtain training data after the historical satellite image is manually labeled with road areas; and train a deep neural network by using the training data to obtain the road identification model, a training objective being that a result of pixel classification by the deep neural network is consistent with information of whether a corresponding pixel in the training data belongs to the road area.

The deep neural network used may be a U-Net, a Deep Residual U-Net, or the like.

The comparison sub-module 03 is configured to compare the road area extracted by the road extraction sub-module 02 with a road area extracted from a satellite image of a previous period of the recent preset period, to obtain the candidate updated road.

The updated road may include a new road or a disappeared road.

If the updated road is a new road, the road network fusion module 10 adds the candidate new road to the road network data according to a coordinate position of the candidate new road, and adds a connection relationship between the candidate new road and an existing road in the road network data, to form to-be-verified road network data after update.

As one preferred implementation, when adding a connection relationship between the candidate new road and an existing road in the road network data, the road network fusion module 10 may extend the candidate new road along a road direction to intersect with the existing road in the road network data; and if a distance between an intersection point and an endpoint of the candidate new road is less than or equal to a preset distance threshold, add an extended road between the intersection point and the endpoint and the connection relationship between the candidate new road and the existing road to the road network data.

If the updated road is a disappeared road, the road network fusion module 10 deletes the disappeared road from the road network data according to a coordinate position of the candidate disappeared road, to form to-be-verified road network data after update.

As one preferred implementation, the trajectory acquisition module 20 can acquire user trajectories within the recent preset period; and determine user trajectories whose number of trajectory points falling into a radiation area of the candidate updated road is greater than or equal to a preset number threshold or whose proportion of trajectory points falling into a radiation area of the candidate updated road is greater than or equal to a preset proportion threshold as user trajectories corresponding to the candidate updated road, to form the user trajectory set.

The road identification module 30 determines matching results between the user trajectory set and the road network data before update as well as the to-be-verified road network data after update respectively, and if the matching result between the user trajectory set and the to-be-verified road network data after update is better than the matching result between the user trajectory set and the road network data before update, identify the candidate updated road as an actual updated road.

Furthermore, the road identification module 30 may specifically include: a road network matching sub-module 31 and a road identification sub-module 32.

The road network matching sub-module 31 is configured to, for the user trajectories in the user trajectory set, determine matching probabilities between the user trajectories and road network data before update and matching probabilities between the user trajectories and the to-be-verified road network data after update respectively through a hidden Markov model.

Specifically, the road network matching sub-module 31 may determine observation probability matrixes of the user trajectories according to distances between trajectory points in the user trajectories and roads in the road network data; determine transition probability matrixes of the user trajectories according to differences between distances of two adjacent points in the user trajectories mapped to roads in the road network data and distances of the two adjacent points in the user trajectories; and perform Viterbi calculation by using the observation probability matrixes and the transition probability matrixes of the user trajectories, to obtain the matching probabilities between the user trajectories and the road network data.

The road identification sub-module 32 is configured to, if an average matching probability between the user trajectories in the user trajectory set and the to-be-verified road network data after update is greater than an average matching probability between the user trajectories in the user trajectory set and the road network data before update, identify the candidate updated road as the actual updated road.

In particular, if the actual updated road includes an actual new road, the road network matching sub-module 31 is further configured to obtain an optimal matching road sequence of the user trajectories in the to-be-verified road network data during the Viterbi calculation.

As one preferred implementation, the road network updating module 50 determines a following road, whose number of occurrence is greater than or equal to a preset number threshold, of the actual new road in the optimal matching road sequence, and determine an actual connection relationship between the actual new road and the following road; and adds the actual new road and the actual connection relationship to the road network data before update to obtain road network data after update.

If the actual updated road includes an actual disappeared road, the road network updating module 50 deletes the actual disappeared road and connection relationships of the actual disappeared road from the road network data before update.

According to an embodiment of the present application, the present application further provides an electronic device and a readable storage medium.

Figure 7:
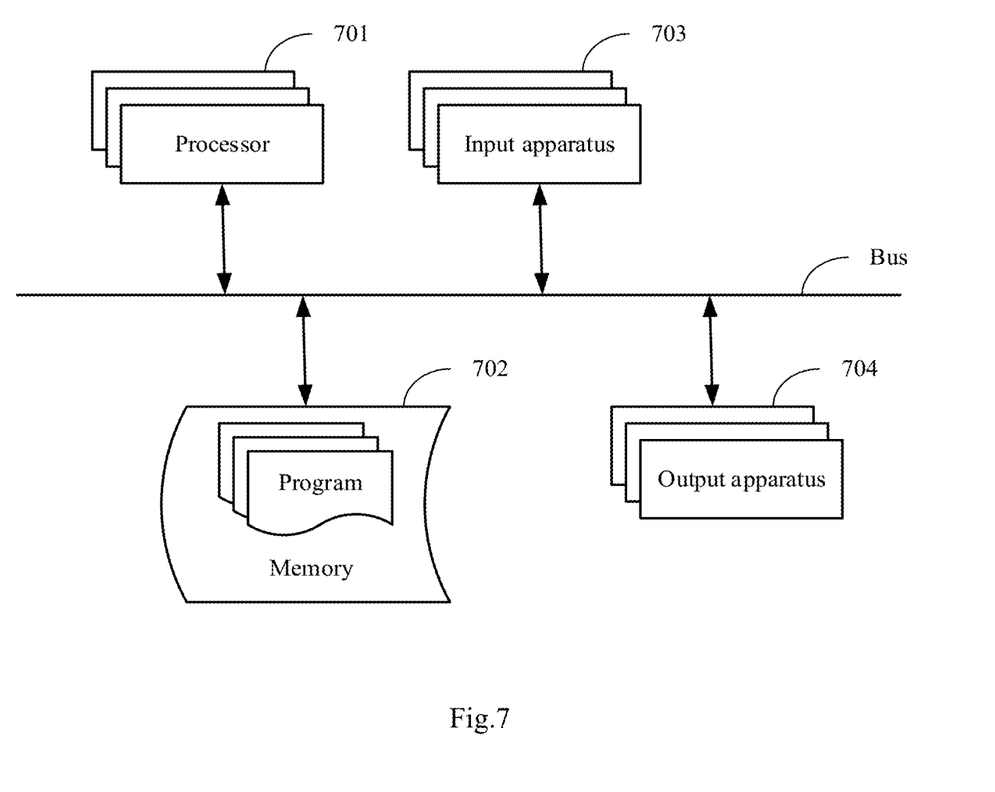
FIG. 7 is a block diagram of an electronic device configured to implement the embodiments of the present disclosure.

As shown in FIG. 7, it is a block diagram of an electronic device of a method for identifying an updated road according to an embodiment of the present application. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistant, cellular phones, smart phones, wearable devices and other similar computing devices. The components, their connections and relationships, and their functions shown herein are examples only, and are not intended to limit the implementation of the present application as described and/or required herein.

As shown in FIG. 7, the electronic device includes: one or more processors 701, a memory 702, and interfaces for connecting various components, including high-speed and low-speed interfaces. The components are connected to each other by using different buses and may be installed on a common motherboard or otherwise as required. The processor may process instructions executed in the electronic device, including instructions stored in the memory or on the memory to display graphical information of a graphical user interface (GUI) on an external input/output apparatus (such as a display device coupled to the interfaces). In other implementations, a plurality of processors and/or buses may be used together with a plurality of memories, if necessary. Similarly, a plurality of electronic devices may be connected, each of which provides some necessary operations (for example, as a server array, a set of blade servers, or a multiprocessor system). One processor 701 is taken as an example is FIG. 7.

The memory 702 is the non-instantaneous computer-readable storage medium according to the present application. The memory stores instructions executable by at least one processor to make the at least one processor perform the method for identifying an updated road according to the present application. The non-instantaneous computer-readable storage medium in the present application stores computer instructions. The computer instructions are used to make a computer perform the method for identifying an updated road according to the present application.

The memory 702, as a non-instantaneous computer-readable storage medium, may be configured to store non-instantaneous software programs, non-instantaneous computer executable programs and modules, for example, program instructions/modules corresponding to the method for identifying an updated road according to the present application. The processor 701 runs the non-instantaneous software programs, instructions and modules stored in the memory 702 to execute various functional applications and data processing of a server, that is, to implement the method for identifying an updated road according to the present application.

The memory 702 may include a program storage area and a data storage area. The program storage area may store an operating system and an application required by at least one function; and the data storage area may store data created according to use of the electronic device. In addition, the memory 702 may include a high-speed random access memory, and may further include a non-instantaneous memory, for example, at least one disk storage device, a flash memory device, or other non-instantaneous solid-state storage devices. In some embodiments, the memory 702 optionally includes memories remotely disposed relative to the processor 701. The remote memories may be connected to the electronic device over a network. Examples of the network include, but are not limited to, the Internet, intranets, local area networks, mobile communication networks and combinations thereof.

The electronic device may further include: an input apparatus 703 and an output apparatus 704. The processor 701, the memory 702, the input apparatus 703 and the output apparatus 704 may be connected through a bus or in other manners. In FIG. 7, the connection through a bus is taken as an example.

The input apparatus 703 may receive input numerical information or character information, and generate key signal input related to user setting and function control of the electronic device, for example, input apparatuses such as a touch screen, a keypad, a mouse, a trackpad, a touch pad, a pointer, one or more mouse buttons, a trackball, and a joystick. The output apparatus 704 may include a display device, an auxiliary lighting device (e.g., an LED) and a tactile feedback device (e.g., a vibration motor). The display device may include, but is not limited to, a liquid crystal display (LCD), a light-emitting diode (LED) display and a plasma display. In some implementations, the display device may be a touch screen.

Various implementations of the systems and technologies described herein may be implemented in a digital electronic circuit system, an integrated circuit system, a dedicated ASIC (application-specific integrated circuit), computer hardware, firmware, software, and/or combinations thereof.

The various implementations may include: being implemented in one or more computer programs, wherein the one or more computer programs may be executed and/or interpreted on a programmable system including at least one programmable processor, and the programmable processor may be a special-purpose or general-purpose programmable processor, receive data and instructions from a storage system, at least one input apparatus and at least one output apparatus, and transmit the data and the instructions to the storage system, the at least one input apparatus and the at least one output apparatus.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device (PLD)) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display device (e.g., a CRT (cathode-ray tube) or an LCD (liquid crystal display) monitor) for displaying information to the user; and a keyboard and pointing device (e.g., a mouse or trackball) through which the user may provide input for the computer. Other kinds of apparatuses may also be configured to provide interaction with the user. For example, a feedback provided for the user may be any form of sensory feedback (for example, visual, auditory, or tactile feedback); and input from the user may be received in any form (including sound input, voice input, or tactile input).

The systems and technologies described herein can be implemented in a computing system including background components (for example, as a data server), or a computing system including middleware components (for example, an application server), or a computing system including front-end components (for example, a user computer with a graphical user interface or webpage browser through which the user can interact with the implementation mode of the systems and technologies described here), or a computing system including any combination of such background components, middleware components or front-end components. The components of the system can be connected to each other through any form or medium of digital data communication (for example, a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other.

It shall be understood that the steps can be reordered, added, or deleted using the various forms of processes shown above. For example, the steps described in the present application may be executed in parallel or sequentially or in different sequences, provided that desired results of the technical solutions disclosed in the present application are achieved, which is not limited herein.

The above specific implementations do not limit the extent of protection of the present application. Those skilled in the art should understand that various modifications, combinations, sub-combinations, and replacements can be made according to design requirements and other factors. Any modifications, equivalent substitutions and improvements made within the spirit and principle of the present application all should be included in the extent of protection of the present application.

What is claimed is:

1. A method for identifying an updated road, comprising:
    acquiring a satellite image within a recent preset period and extracting a road area from the acquired satellite image; and comparing the extracted road area with a road area extracted from a satellite image of a previous period of the recent preset period, to obtain the candidate updated road which is a new road;
    mapping the candidate updated road into road network data according to a coordinate position of the candidate updated road, wherein
    in a case that the updated road is a new road which is a road area existing in the satellite image of the recent preset period but not existing in a historical satellite image out of the recent preset period, the mapping the candidate updated road into road network data according to a coordinate position of the candidate updated road comprises: adding the candidate new road to the road network data according to a coordinate position of the candidate new road, and adding a connection relationship between the candidate new road and an existing road in the road network data, to form to-be-verified road network data after update, and
    in a case that the updated road is a disappeared road which is a road area not existing in the satellite image of the recent preset period but existing in a historical satellite image out of the recent preset period, the mapping the candidate updated road into road network data according to a coordinate position of the candidate updated road comprises: deleting the candidate disappeared road from the road network data according to a coordinate position of the candidate disappeared road, to form to-be-verified road network data after update;
    acquiring user trajectories within the recent preset period; and determining user trajectories whose number of trajectory points falling into a radiation area of the candidate updated road is greater than or equal to a preset number threshold or whose proportion of trajectory points falling into a radiation area of the candidate updated road is greater than or equal to a preset proportion threshold as user trajectories corresponding to the candidate updated road, to form the user trajectory set; and
    determining if an average matching probability between the user trajectories in the user trajectory set and the to-be-verified road network data after update is greater than an average matching probability between the user trajectories in the user trajectory set and the road network data before update, if the determining result is greater, identifying the candidate updated road as the actual updated road; and
    updating the road network data by using the actual updated road to obtain actual road network data, wherein the updating the road network data comprises:

in a case that the actual updated road comprises an actual new road, adding the actual new road and the actual connection relationship to the road network data before update to obtain road network data after update, and in a case that the actual updated road comprises an actual disappeared road, deleting the actual disappeared road and connection relationships of the actual disappeared road from the road network data before update.

2. The method according to claim 1, wherein the extracting a road area from the acquired satellite image comprises:
inputting the acquired satellite image to a pre-trained road identification model; and
acquiring a road area obtained by the road identification model based on pixel classification.

3. The method according to claim 2, wherein the road identification model is pre-trained in the following manners:
obtaining training data after the historical satellite image is associated with road information in a road network; or obtaining training data after the historical satellite image is manually labeled with road areas; and
training a deep neural network by using the training data to obtain the road identification model, a training objective being that a result of pixel classification by the deep neural network is consistent with information of whether a corresponding pixel in the training data belongs to the road area.

4. The method according to claim 1, wherein the adding a connection relationship between the candidate new road and an existing road in the road network data comprises:
extending the candidate new road along a road direction to intersect with the existing road in the road network data; and
if a distance between an intersection point and an endpoint of the candidate new road is less than or equal to a preset distance threshold, adding an extended road between the intersection point and the endpoint and the connection relationship between the candidate new road and the existing road to the road network data.

5. The method according to claim 1, wherein the matching result between the user trajectory set and the to-be-verified road network data after update is determined by: for the user trajectories in the user trajectory set, determining matching probabilities between the user trajectories and the to-be-verified road network data respectively through a hidden Markov model; and determining an average matching probability between the user trajectories in the user trajectory set and the to-be-verified road network data after update; and
the matching result between the user trajectory set and the road network data before update is determined by: for the user trajectories in the user trajectory set, determining matching probabilities between the user trajectories and the road network data before update respectively through the hidden Markov model; and determining an average matching probability between the user trajectories in the user trajectory set and the road network data before update.

6. The method according to claim 5, wherein the determining matching probabilities between the user trajectories and the road network data comprises:
determining observation probability matrixes of the user trajectories according to distances between trajectory points in the user trajectories and roads in the road network data;
determining transition probability matrixes of the user trajectories according to differences between distances of two adjacent points in the user trajectories mapped to the roads in the road network data and distances of the two adjacent points in the user trajectories; and
performing Viterbi calculation by using the observation probability matrixes and the transition probability matrixes of the user trajectories, to obtain the matching probabilities between the user trajectories and the road network data.

7. The method according to claim 6, wherein if the actual updated road comprises an actual new road, the method further comprises:
further obtaining an optimal matching road sequence of the user trajectories in the to-be-verified road network data during the Viterbi calculation;
determining a following road, whose number of occurrence is greater than or equal to a preset number threshold, of the actual new road in the optimal matching road sequence, and determining an actual connection relationship between the actual new road and the following road.

8. An electronic device, comprising:
at least one processor; and
a memory communicatively connected with the at least one processor;
wherein the memory stores instructions executable by the at least one processor, and the instructions are executed by the at least one processor to enable the at least one processor to perform a method for identifying an updated road, wherein the method comprise:
acquiring a satellite image within a recent preset period and extracting a road area from the acquired satellite image; and comparing the extracted road area with a road area extracted from a satellite image of a previous period of the recent preset period, to obtain the candidate updated road which is a new road;
mapping the candidate updated road into road network data according to a coordinate position of the candidate updated road, wherein
in a case that the updated road is a new road which is a road area existing in the satellite image of the recent preset period but not existing in a historical satellite image out of the recent preset period, the mapping the candidate updated road into road network data according to a coordinate position of the candidate updated road comprises: adding the candidate new road to the road network data according to a coordinate position of the candidate new road, and adding a connection relationship between the candidate new road and an existing road in the road network data, to form to-be-verified road network data after update, and
in a case that the updated road is a disappeared road which is a road area not existing in the satellite image of the recent preset period but existing in a historical satellite image out of the recent preset period, the mapping the candidate updated road into road network data according to a coordinate position of the candidate updated road comprises: deleting the candidate disappeared road from the road network data according to a coordinate position of the candidate disappeared road, to form to-be-verified road network data after update;
acquiring user trajectories within the recent preset period; and determining user trajectories whose number of trajectory points falling into a radiation area of the candidate updated road is greater than or equal to a preset number threshold or whose proportion of trajectory points falling into a radiation area of the candidate updated road is greater than or equal to a preset proportion threshold as user trajectories corresponding to the candidate updated road, to form the user trajectory set; and determining if an average matching probability between the user trajectories in the user trajectory set and the to-be-verified road network data after update is greater than an average matching probability between the user trajectories in the user trajectory set and the road network data before update, if the determining result is greater, identifying the candidate updated road as the actual updated road; and updating the road network data by using the actual updated road to obtain actual road network data, wherein the updating the road network data comprises:

in a case that the actual updated road comprises an actual new road, adding the actual new road and the actual connection relationship to the road network data before update to obtain road network data after update, and in a case that the actual updated road comprises an actual disappeared road, deleting the actual disappeared road and connection relationships of the actual disappeared road from the road network data before update.

9. A non-transitory computer readable storage medium with computer instructions stored thereon, wherein the computer instructions are used for causing a computer to perform a method for identifying an updated road, wherein the method comprises:

acquiring a satellite image within a recent preset period and extracting a road area from the acquired satellite image; and comparing the extracted road area with a road area extracted from a satellite image of a previous period of the recent preset period, to obtain the candidate updated road which is a new road;

mapping the candidate updated road into road network data according to a coordinate position of the candidate updated road, wherein in a case that the updated road is a new road which is a road area existing in the satellite image of the recent preset period but not existing in a historical satellite image out of the recent preset period, the mapping the candidate updated road into road network data according to a coordinate position of the candidate updated road comprises: adding the candidate new road to the road network data according to a coordinate position of the candidate new road, and adding a connection relationship between the candidate new road and an existing road in the road network data, to form to-be-verified road network data after update, and in a case that the updated road is a disappeared road which is a road area not existing in the satellite image of the recent preset period but existing in a historical satellite image out of the recent preset period, the mapping the candidate updated road into road network data according to a coordinate position of the candidate updated road comprises: deleting the candidate disappeared road from the road network data according to a coordinate position of the candidate disappeared road, to form to-be-verified road network data after update;

acquiring user trajectories within the recent preset period; and determining user trajectories whose number of trajectory points falling into a radiation area of the candidate updated road is greater than or equal to a preset number threshold or whose proportion of trajectory points falling into a radiation area of the candidate updated road is greater than or equal to a preset proportion threshold as user trajectories corresponding to the candidate updated road, to form the user trajectory set; and determining if an average matching probability between the user trajectories in the user trajectory set and the to-be-verified road network data after update is greater than an average matching probability between the user trajectories in the user trajectory set and the road network data before update, if the determining result is greater, identifying the candidate updated road as the actual updated road; and updating the road network data by using the actual updated road to obtain actual road network data, wherein the updating the road network data comprises:

in a case that the actual updated road comprises an actual new road, adding the actual new road and the actual connection relationship to the road network data before update to obtain road network data after update, and in a case that the actual updated road comprises an actual disappeared road, deleting the actual disappeared road and connection relationships of the actual disappeared road from the road network data before update.

\* \* \* \* \*